United States Patent
Isozaki

(10) Patent No.: US 9,311,729 B2
(45) Date of Patent: Apr. 12, 2016

(54) INFORMATION PROCESSING APPARATUS, INFORMATION PROCESSING METHOD, AND PROGRAM

(71) Applicant: Sony Corporation, Tokyo (JP)

(72) Inventor: Takashi Isozaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 326 days.

(21) Appl. No.: 13/845,626

(22) Filed: Mar. 18, 2013

(65) Prior Publication Data

US 2013/0257873 A1 Oct. 3, 2013

(30) Foreign Application Priority Data

Mar. 28, 2012 (JP) ................................ 2012-072789

(51) Int. Cl.
*G06K 9/62* (2006.01)
*G06N 7/00* (2006.01)
*G06N 3/08* (2006.01)
*G06T 11/20* (2006.01)

(52) U.S. Cl.
CPC .............. *G06T 11/206* (2013.01); *G06N 7/005* (2013.01); *G06K 9/6278* (2013.01); *G06K 9/6296* (2013.01)

(58) Field of Classification Search
CPC ...... G06K 9/6296; G06K 9/6278; G06N 3/08
See application file for complete search history.

(56) References Cited

U.S. PATENT DOCUMENTS 7,117,185 B1 * 10/2006 Aliferis et al. .................. 706/12
2007/0203870 A1 * 8/2007 Saito ............................... 706/52

OTHER PUBLICATIONS

P. Spirtes, C. Glymour, R. Scheines, "Causation, Prediction" MIT Press, second edition 2000, pp. 82-87.
R. Yehezkel, B. Lerner, "Bayesian Network Structure Learning by Recursive Autonomy Identification", Journal of Machine Learning Research, vol. 10, pp. 1527-1570, 2009.
X. Xie, Z. Geng, "A Recursive Method for Structural Learning of Directed Acyclic Graphs", Journal of Machine Learning Research, vol. 9, pp. 459-483, 2008.

* cited by examiner

*Primary Examiner* — Matthew D Salvucci
(74) *Attorney, Agent, or Firm* — Hazuki International, LLC

(57) ABSTRACT

An information processing apparatus that tests independence among a multiplicity of variables includes an execution section and a determination section. The execution section executes a test for conditional independence between two variables in a graphical model that are at least not independent in the case where a condition variable serving as a condition for independence between the two variables is provided on a path between the two variables. The determination section determines whether or not a V-shaped structure is present on a path between the two variables, the V-shaped structure being a graph structure in which first and second variables that are independent are each not independent of a third variable. The execution section does not execute a test for conditional independence between the two variables in the case where the condition variable is provided only on a path determined to have the V-shaped structure.

12 Claims, 11 Drawing Sheets

INFORMATION PROCESSING APPARATUS, INFORMATION PROCESSING METHOD, AND PROGRAM

CROSS-REFERENCE TO RELATED APPLICATION

The present application claims priority from Japanese Patent Application No. JP 2012-072789 filed in the Japanese Patent Office on Mar. 28, 2012, the entire content of which is incorporated herein by reference.

BACKGROUND

The present technology relates to an information processing apparatus, an information processing method, and a program, and in particular to an information processing apparatus, an information processing method, and a program capable of enhancing the reliability of estimated cause-and-effect relationship among a multiplicity of variables.

Estimation of statistical cause-and-effect relationship from observation data on multivariate random variables according to the related art is roughly divided into a method of obtaining as a score the results of estimation by an information criterion, a maximum likelihood method with penalties, or a Bayesian method and maximizing the score, and a method of estimating the cause-and-effect relationship between variables through a statistical test for the conditional independence between the variables. The resulting cause-and-effect relationship between the variables is often expressed as a graphical model (acyclic model) for good readability of the results.

FIG. 1 shows three examples of a graphical model representing the cause-and-effect relationship between a variable X and a variable Y.

In the graphical model shown in the upper part of FIG. 1, the cause-and-effect relationship between the variable X and the variable Y is unidentified, and the variable X and the variable Y serve as vertexes linked by a non-directional side (undirected edge). In the graphical model shown in the middle part of FIG. 1, the cause-and-effect relationship between the variable X and the variable Y is that the variable X corresponds to the cause and the variable Y corresponds to the effect, and the variable X and the variable Y serve as vertexes linked by a directional side (directed edge) indicating the direction from the cause to the effect. In the graphical model shown in the lower part of FIG. 1, the variable X and the variable Y serve as vertexes lined by three variables and sides that link the variables. In the graphical model shown in the lower part of FIG. 1, the three variables and the sides that link the variables form a path between the variable X and the variable Y, and the path may partially include a directed edge.

The method of estimating the cause-and-effect relationship between variables through a statistical test for the conditional independence between the variables has been rendered important, because the method may possibly estimate the existence of a potential common cause variable and the reason for the direction of a directed edge is based on a physical background. On the other hand, however, the reliability of the estimation results has been low because of an insufficient detection capability of the statistical test.

In an initial attempt of the method, in order to perform a test for the conditional independence between two variables among n-variate random variables, it is considered to extract all combinations of variables, the number of which is 0 at minimum and (n−2) at maximum, from (n−2) variables as a set of condition variables that serve as a condition for the conditional independence, and to perform testing in a round-robin manner. In this case, however, the number of combinations of variables is increased exponentially, and it is not practical to perform calculation using a calculator.

There has later been disclosed an algorithm that significantly reduces the amount of calculation necessary for testing (see P. Spirtes, C. Glymour, R. Scheines, "Causation, Prediction, and Search", MIT Press, second edition, 2000). If it is assumed that the conditional independence between variables is expressed uniquely by a directed acyclic graph, a set of condition variables that makes two certain variables conditionally independent is determined uniquely, and the condition variables are not conditionally independent of the variable in focus. Under such conditions, testing is performed while increasing the number of the set of condition variables in the ascending order, and a side between the two variables is removed immediately in the case where the independence is not rejected. However, such an algorithm still involves a large number of trials in the test, which may cause frequent test errors.

In order to address such an issue, P. Spirtes et al. also discloses an improvement on the algorithm discussed above that further reduces the amount of calculation on condition that the condition variables are provided on the path between the two variables in focus. During execution of the algorithm, however, sides that are later determined to be independent remain, and it is therefore permitted to follow a long path. Thus, the number of trials in the test may not be effectively significantly reduced.

There is proposed an algorithm that reduces the number of trials of independence tests with a large number of a set of condition variables by recursively dividing the entire graph into small sub-graphs (see R. Yehezkel, B. Lerner, "Bayesian Network Structure Learning by Recursive Autonomy Identification", Journal of Machine Learning Research, Vol. 10, pp. 1527-1570, 2009). However, the algorithm may not be able to suppress occurrence of a test error that variables that are intrinsically not independent are determined to be independent in an independence test with a small number of a set of condition variables.

Further, X. Xie, Z. Geng, "A Recursive Method for Structural Learning of Directed Acyclic Graphs", Journal of Machine Learning Research, Vol. 9, pp. 459-483, 2008 discloses performing a recursive process in a method different from the method according to R. Yehezkel et al. In the method according to X. Xie et al., however, a large number of condition variables are necessary for an independence test, which may result in a lack of stability of calculation.

SUMMARY

Thus, there has not been a method to sufficiently improve the low reliability of estimation of the cause-and-effect relationship among a multiplicity of variables by a conditional independence test.

It is therefore desirable to enhance the reliability of estimated cause-and-effect relationship among a multiplicity of variables.

According to an embodiment of the present technology, there is provided an information processing apparatus that tests independence among a multiplicity of variables, including: an execution section that executes a test for conditional independence between two variables in a graphical model that are at least not independent in the case where a condition variable serving as a condition for independence between the two variables is provided on a path between the two variables; and a determination section that determines whether or not a V-shaped structure is present on a path between the two variables, the V-shaped structure being a graph structure in which first and second variables that are independent are each not independent of a third variable, in which the execution section does not execute a test for conditional independence between the two variables in the case where the condition variable is provided only on a path determined to have the V-shaped structure.

The execution section may not execute a test for conditional independence between the two variables in the case where the condition variable is the third variable in the V-shaped structure.

The execution section may execute a test for unconditional independence between the first and second variables before executing a test for conditional independence, and the information processing apparatus may further include a V-shaped structure search section that searches for a graph structure in which the first and second variables are unconditionally independent and in which the first and second variables are each not independent of the third variable as the V-shaped structure.

The V-shaped structure search section may search for a graph structure in which the first and second variables are conditionally independent on condition of a variable other than the third variable and in which the first and second variables are each not independent of the third variable as the V-shaped structure.

The V-shaped structure search section may not search for the V-shaped structure in the case where the number of a set of the condition variables is incremented to exceed a predetermined number.

The determination section may determine whether or not the V-shaped structure is present for a number of paths between the two variables, the number of paths corresponding to the number of a set of the condition variables which is incremented, and the execution section may not execute a test for conditional independence between the two variables in the case where any of the condition variables is provided on any of paths determined to have the V-shaped structure.

The information processing apparatus may further include a contradiction detection section that detects a contradiction between directed edges in a plurality of the V-shaped structures to change some or all of the directed edges into undirected edges to resolve the contradiction.

The contradiction detection section may use an index used in a test for independence between the first and second variables in the plurality of V-shaped structures to change directed edges of the V-shaped structure having the first and second variables which are less dependent into undirected edges.

In the case where a variable X and a variable W are not independent in a first V-shaped structure in which the variable X and a variable Y are each not independent of a variable Z and a second V-shaped structure in which the variable W and the variable Y are each not independent of the variable Z, the contradiction detection section may change a directed edge from the variable X to the variable Z in the first V-shaped structure and a directed edge from the variable W to the variable Z in the second V-shaped structure into undirected edges.

In the case where a variable X and a variable W are not independent in a first V-shaped structure in which the variable X and a variable Y are each not independent of a variable Z and a second V-shaped structure in which the variable W and the variable Y are each not independent of the variable Z, the contradiction detection section may change all the directed edges in the first and second V-shaped structures into undirected edges.

In the case where a variable X and a variable W are not independent in a first V-shaped structure in which the variable X and a variable Y are each not independent of a variable Z and a second V-shaped structure in which the variable W and the variable Y are each not independent of the variable Z, the contradiction detection section may use an index used in a test for independence between two variables to compare independence between the variable X and the variable Y and independence between the variable W and the variable Y to change directed edges of the V-shaped structure having two less independent variables into undirected edges.

According to an embodiment of the present technology, there is provided an information processing method for an information processing apparatus that tests independence among a multiplicity of variables, including: executing a test for conditional independence between two variables in a graphical model that are at least not independent in the case where a condition variable serving as a condition for independence between the two variables is provided on a path between the two variables; and determining whether or not a V-shaped structure is present on a path between the two variables, the V-shaped structure being a graph structure in which first and second variables that are independent are each not independent of a third variable, in which a test for conditional independence between the two variables is not executed in the case where the condition variable is provided only on a path determined to have the V-shaped structure.

According to an embodiment of the present technology, there is provided a program that causes a computer to execute a process for testing independence among a multiplicity of variables, the process including: executing a test for conditional independence between two variables in a graphical model that are at least not independent in the case where a condition variable serving as a condition for independence between the two variables is provided on a path between the two variables; and determining whether or not a V-shaped structure is present on a path between the two variables, the V-shaped structure being a graph structure in which first and second variables that are independent are each not independent of a third variable, in which a test for conditional independence between the two variables is not executed in the case where the condition variable is provided only on a path determined to have the V-shaped structure.

In an embodiment of the present technology, a test for conditional independence between two variables is executed in the case where a condition variable serving as a condition for independence between the two variables is provided on a path between the two variables. It is determined whether or not a V-shaped structure is present on a path between the two variables, the V-shaped structure being a graph structure in which first and second variables that are independent are each not independent of a third variable. A test for conditional independence between the two variables is not executed in the case where the condition variable is provided only on a path determined to have the V-shaped structure.

According to an embodiment of the present technology, it is possible to enhance the reliability of estimated cause-and-effect relationship among a multiplicity of variables.

DETAILED DESCRIPTION OF EMBODIMENTS

An embodiment of the present technology will be described below with reference to the drawings.

Hardware Configuration Example of Information Processing Apparatus

Figure 1:
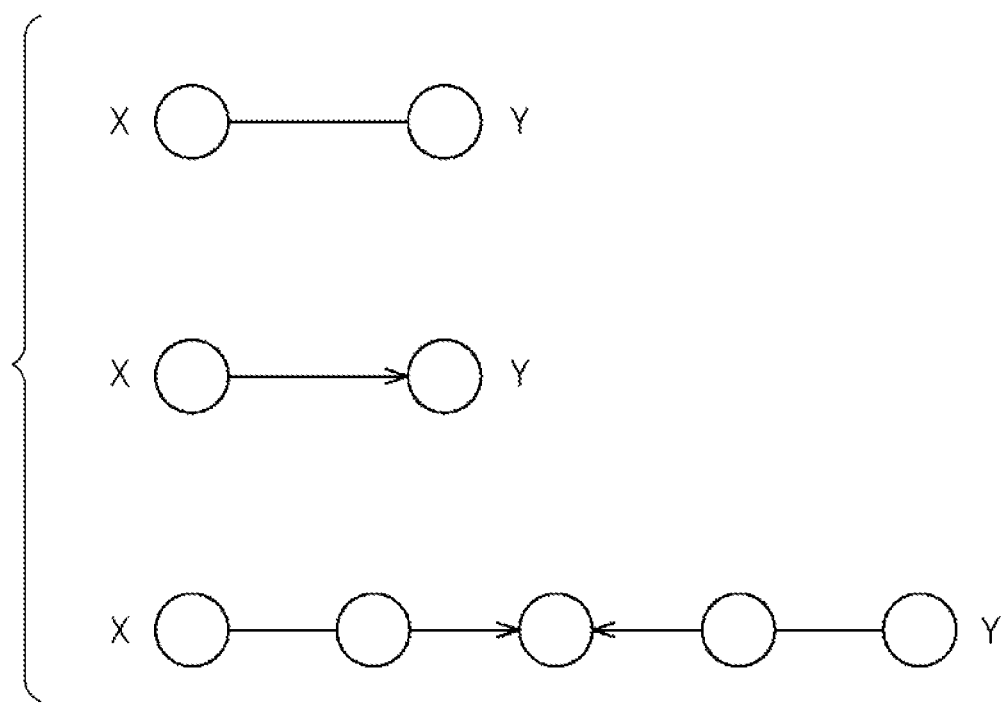
FIG. 1 shows examples of a graphical model.
Figure 2:
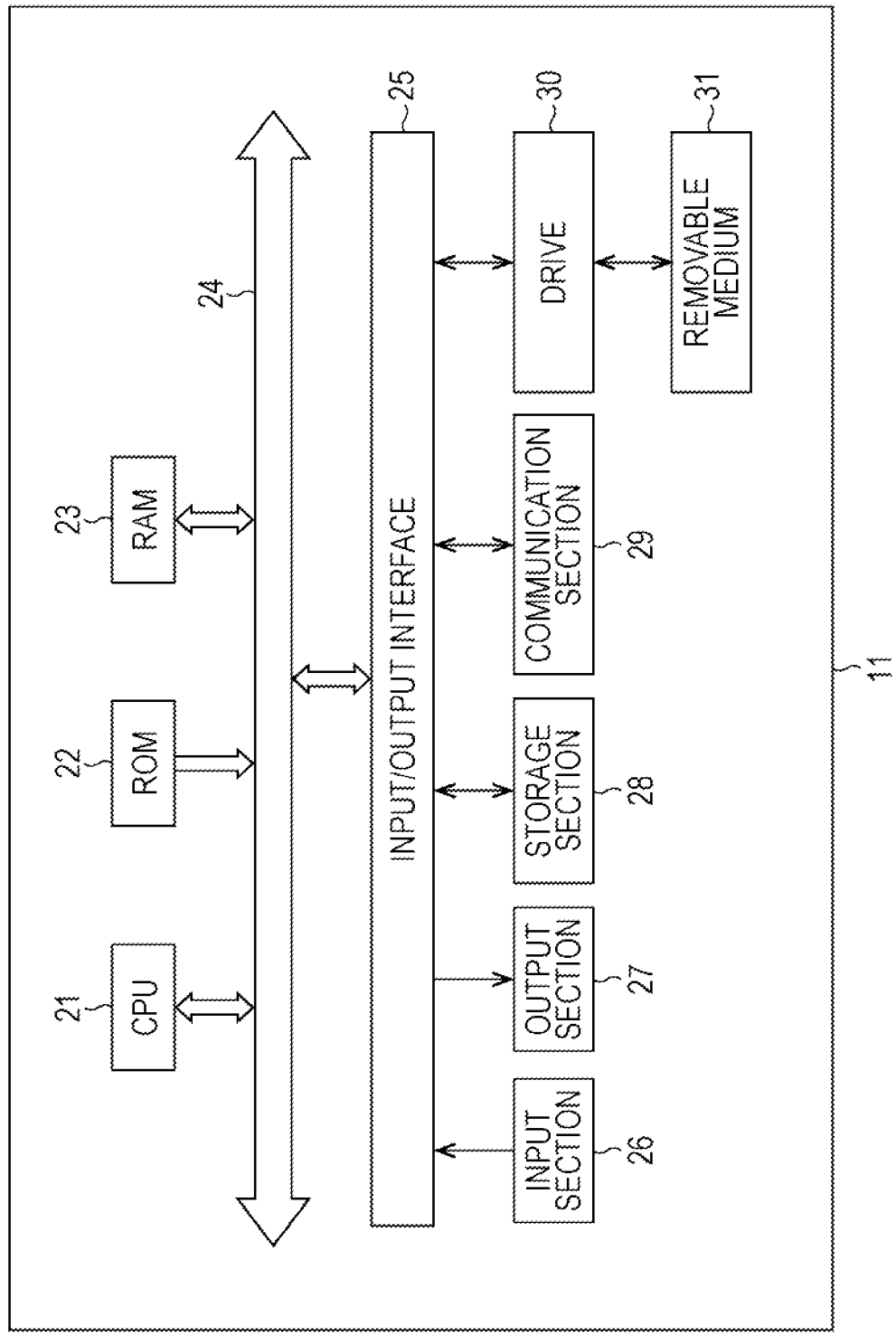
FIG. 2 is a block diagram showing a hardware configuration example of an information processing apparatus according to an embodiment of the present technology.

FIG. 2 shows a hardware configuration example of an information processing apparatus 11 according to an embodiment of the present technology.

The information processing apparatus 11 tests the independence or conditional independence between discrete multivariate random variables, and outputs the test results as a Bayesian network which is one type of graphical models.

The information processing apparatus 11 may be composed of a personal computer, for example, and may have a configuration similar to that of the personal computer.

The information processing apparatus 11 includes a CPU (Central Processing Unit) 21, a ROM (Read Only Memory) 22, a RAM (Random Access Memory) 23, a bus 24, an input/output interface 25, an input section 26, an output section 27, a storage section 28, a communication section 29, and a drive 30.

In the information processing apparatus 11, the CPU 21, the ROM 22, and the RAM 23 are connected to each other through the bus 24. The input/output interface 25 is further connected to the bus 24. To the input/output interface 25, the input section 26 such as a keyboard, a mouse, and a touch panel, the output section 27 such as a display and a speaker, the storage section 28 such as a hard disk drive and a non-volatile memory, and the communication section 29 such as a network interface are connected.

In addition, the drive 30 is connected to the input/output interface 25 as necessary. A removable medium 31 such as a magnetic disk, an optical disc, a magneto-optical disk, and a semiconductor memory is mounted to the drive 30 as appropriate. A program read from the removable medium 31 is installed in the storage section 28 as necessary.

Alternatively, the program may be received by the communication section 29 via a wired or wireless transfer medium to be installed in the storage section 28. Still alternatively, the program may be installed in advance in the ROM 22 or the storage section 28.

The program executed by the information processing apparatus 11 may be processed chronologically in accordance with the order described herein, or may be processed in parallel or at an appropriate timing when a call is made, for example.

Functional Configuration Example of Information Processing Apparatus

Figure 3:
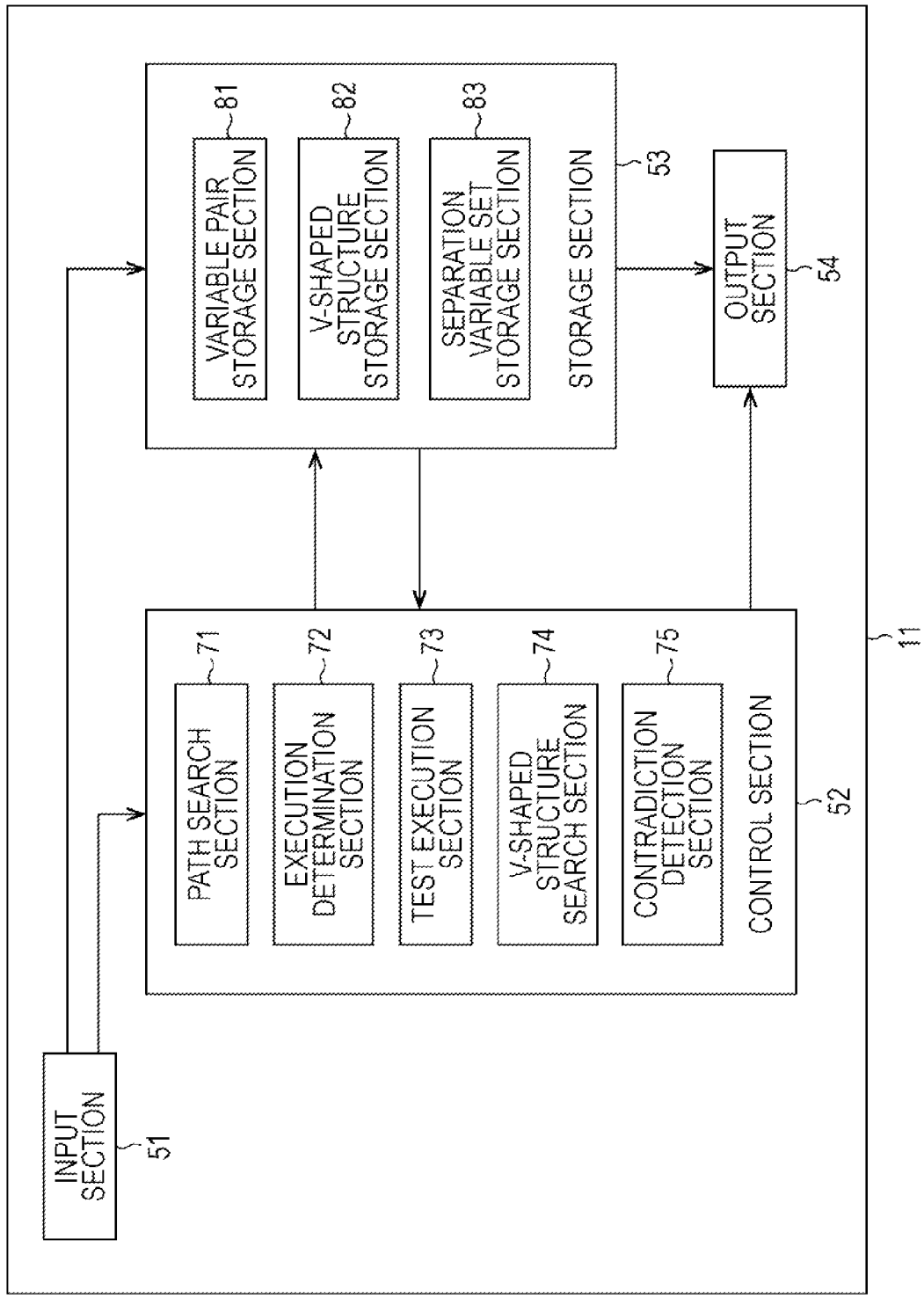
FIG. 3 is a block diagram showing a functional configuration example of the information processing apparatus according to the embodiment of the present technology.

FIG. 3 shows a functional configuration example of a portion of the information processing apparatus 11 related to the embodiment of the present technology.

The information processing apparatus 11 of FIG. 3 includes an input section 51, a control section 52, and a storage section 53, and an output section 54.

The input section 51 corresponds to the input section 26 of FIG. 2. The input section 51 receives input of an argument for designating two variables to be subjected to an independence test, among N discrete random variables, a variable set of condition variables that serve as conditions for conditional independence, etc., and supplies information corresponding to the content of the input to the control section 52.

The control section 52 corresponds to the CPU 21 of FIG. 2. The control section 52 operates in accordance with a program stored in the storage section 53 which corresponds to the storage section 28 of FIG. 2, and executes a test for the independence between two variables in focus using various information stored in the storage section 53.

The output section 54 corresponds to the output section 27 of FIG. 2. The output section 54 outputs the results of an independence test as a graphical model under control by the control section 52.

As shown in FIG. 3, the control section 52 includes a path search section 71, an execution determination section 72, a test execution section 73, a V-shaped structure search section 74, and a contradiction detection section 75, and the storage section 53 includes a variable pair storage section 81, a V-shaped structure storage section 82, and a separation variable set storage section 83.

The path search section 71 searches for a path between the two variables in focus using a general algorithm such as a depth-first search, for example.

The execution determination section 72 determines whether or not it is necessary to execute an independence test for the two variables in focus.

The test execution section 73 executes an independence test for the two variables in focus. It should be noted, however, that the test execution section 73 does not execute an independence test in the case where the execution determination section 72 determines that it is not necessary to execute an independence test.

Figure 4:
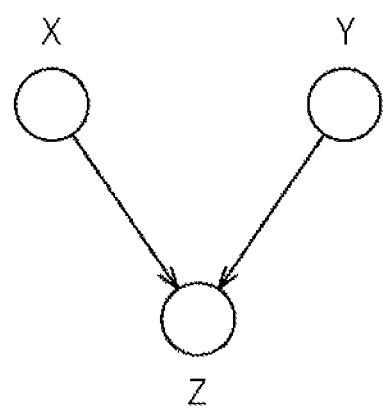
FIG. 4 illustrates a V-shaped structure.

The V-shaped structure search section 74 searches for a V-shaped structure for two variables determined to be independent. The V-shaped structure is a graph structure in which a variable X and a variable Y are independent, the variable X and a variable Z are not independent, and the variable Y and the variable Z are not independent as shown in FIG. 4, for example.

The contradiction detection section 75 detects, from the V-shaped structures found by the V-shaped structure search section 74, V-shaped structures that contradict with each other, and resolves the contradiction between the V-shaped structures.

The variable pair storage section 81 stores variable pairs in which two variables that are not independent or that have not been subjected to an independence test are linked by a side.

The V-shaped structure storage section 82 stores the V-shaped structures found by the V-shaped structure search section 74. The execution determination section 72 determines whether or not it is necessary to execute an independence test for the two variables in focus in accordance with whether or not any graph structure matching the V-shaped structures stored in the V-shaped structure storage section 82 is provided on a path between the two variables.

The separation variable set storage section 83 stores condition variables provided on a path between two variables determined to be conditionally independent in the independence test executed by the test execution section 73, as a separation variable set that separates the two variables.

Independence Testing Process Performed by Information Processing Apparatus

Figure 5:
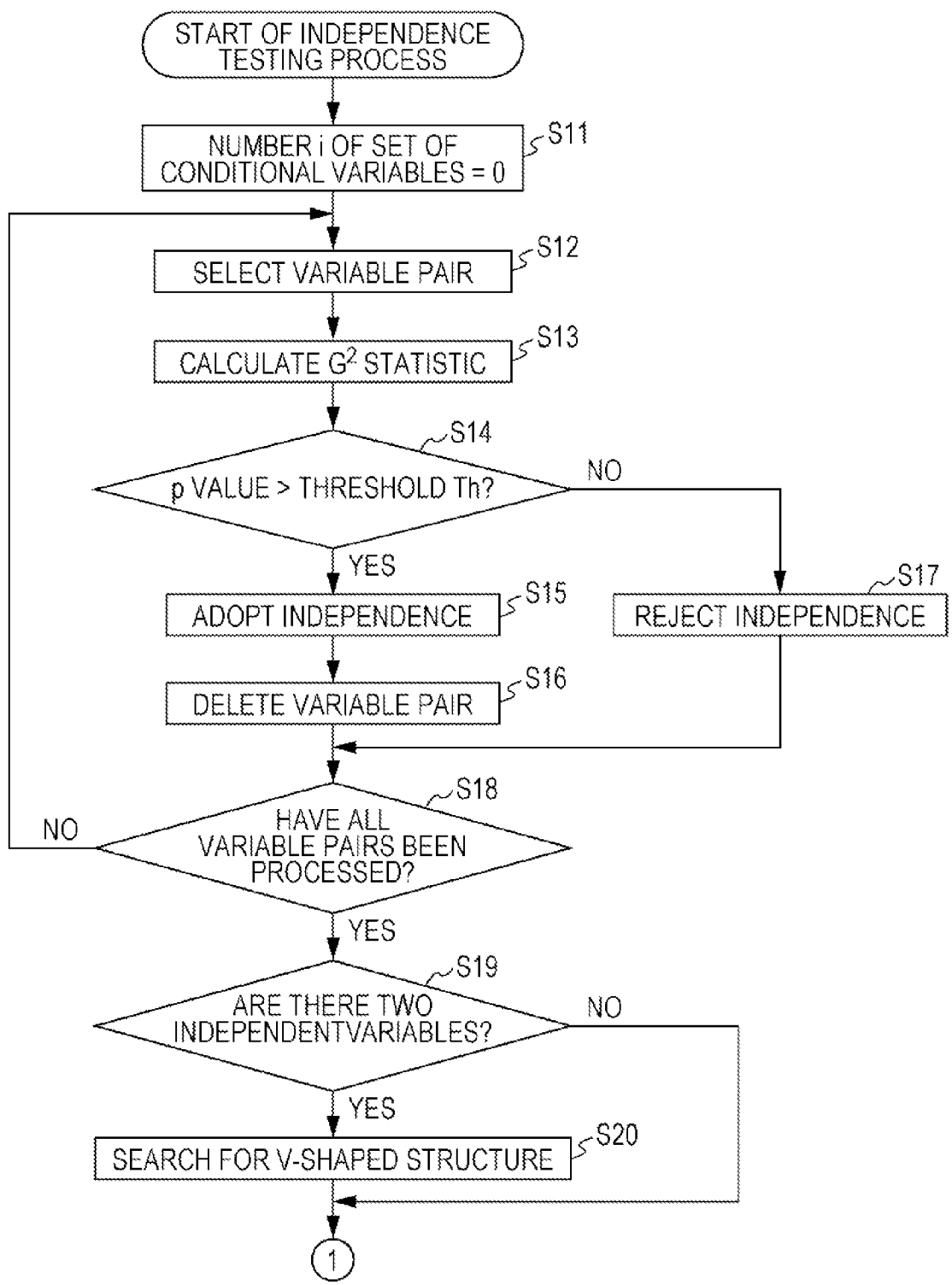
FIG. 5 is a flowchart illustrating an independence testing process.

Next, an independence testing process performed by the information processing apparatus 11 will be described with reference to the flowcharts of FIGS. 5 and 6. The storage section 53 stores in advance the number N of random variables (which may be hereinafter referred to simply as "variables") and the number of internal states that each of the variables may take, which is 2 or more. When M data describing the state of all the variables are input by the input section 51, the independence testing process is started.

In the initial state, the variable pair storage section 81 stores variable pairs in which the N variables are paired (linked by a side) with different (N−1) variables, and the V-shaped structure storage section 82 and the separation variable set storage section 83 stores no data.

In step S11, the control section 52 sets the number i of a set of condition variables (which may be hereinafter referred to as "conditional variables") to 0, that is, makes the set of conditional variables an empty set.

In step S12, the control section 52 selects one variable pair from the variable pairs stored in the variable pair storage section 81.

In step S13, the test execution section 73 calculates a G2 statistic which is a value used to execute an independence test. The G2 statistic is given by the following formula (1).

$$G^2 = 2M \sum_{x,y,z} \hat{P}(x, y, z) \log \frac{\hat{P}(x \mid y, z)}{\hat{P}(x \mid z)} \quad (1)$$

In the formula (1), M indicates the number of data. P(x, y, z) affixed with a symbol "^" (hat) (hereinafter referred to as "hatted P(x, y, z)", for example), hatted P(x|y, z), and hatted P(x|z) represent an estimated joint probability of certain states x, y, and z for the variables X and Y and the set of variables Z, an estimated conditional probability of the state x on condition of the states y and z, and an estimated conditional probability of the state x on condition of the state z, respectively. These probabilities are estimated using the M data. In step S13, the set of variables Z is an empty set, and thus the state z is not considered.

Here, a comparison is performed between a p value and a predetermined threshold Th (for example, 5% (0.05)) to test the independence between the two variables of the selected variable pair. The p value is derived using the G2 statistic discussed above and 2 distribution to serve as an index for an independence test.

That is, in step S14, the test execution section 73 determines whether or not the p value is more than the threshold Th.

If it is determined in step S14 that the p value is more than the threshold Th, the process proceeds to step S15, where the test execution section 73 adopts the independence between the two variables of the selected variable pair.

Then, in step S16, the test execution section 73 deletes the selected variable pair from the variable pair storage section 81.

If it is determined in step S14 that the p value is not more than the threshold Th, the process proceeds to step S17, where the test execution section 73 rejects the independence between the two variables of the selected variable pair.

In the description provided above, a p value is used as an index for an independence test. However, a conditional mutual information amount MI indicated by the following formula (2) may be used as an index of an independence test.

$$MI = \frac{G^2}{2M} \quad (2)$$

In this case, a comparison is performed between the conditional mutual information amount MI and a predetermined threshold (for example, 0.05). If it is determined that the conditional mutual information amount MI is less than the threshold, the independence between the two variables is adopted.

In step S18 which follows step S16 or step S17, the control section 52 determines whether or not the processes in step S12 to step S17 have been executed, that is, an unconditional independence test has been executed, for all the variable pairs stored in the variable pair storage section 81.

If it is determined in step S18 that all the variable pairs have not been processed, the process returns to step S12 to repeat the processes in step S12 to step S17 for a newly selected variable pair.

If it is determined in step S18 that all the variable pairs have been processed, on the other hand, the process proceeds to step S19. At this time, the variable pair storage section 81 stores only variable pairs with two variables, the independence between which has been rejected (two variables that are not independent).

In step S19, the control section 52 determines whether or not there are two independent variables found in the processes discussed above.

If it is determined in step S19 that there is at least one set of two independent variables, the process proceeds to step S20, where the V-shaped structure search section 74 searches for a V-shaped structure for the two independent variables. Specifically, in the case where a certain set of variables X and Y are independent and are each not independent of a variable Z, that is, in the case where the variables X and Y have a path (X-Z-Y) including two sides and the variable Z therebetween and the variable Z does not contribute as a condition variable to the independence between the variables X and Y as shown in FIG. 4, the V-shaped structure search section 74 causes the V-shaped structure storage section 82 to store such a graph structure as a V-shaped structure (hereinafter represented as "X→Z←Y", for example).

If it is determined in step S19 that there is no set of two independent variables, on the other hand, step S20 is skipped.

Figure 6:
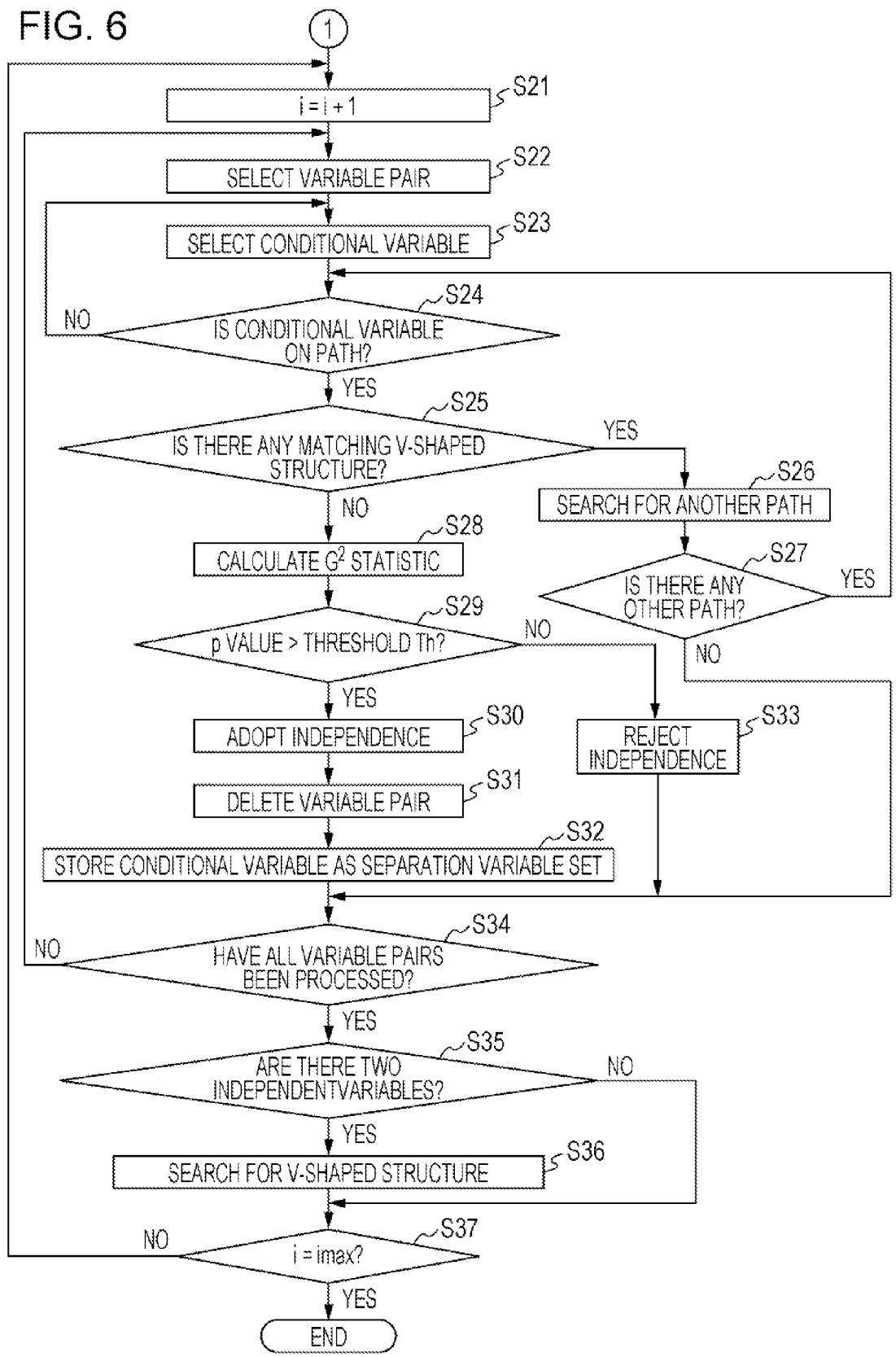
FIG. 6 is a flowchart illustrating the independence testing process.

After that, the process proceeds to step S21 of FIG. 6, where the control section 52 increments the number i of the set of conditional variables (condition variables) by 1. That is, the number of the set of conditional variables is set to 1.

In step S22, the control section 52 selects one variable pair from the variable pairs stored in the variable pair storage section 81, that is, from variable pairs with two variables that are not independent. Here, it is assumed that a variable pair with a variable S and a variable T has been selected.

In step S23, the control section 52 selects a conditional variable that may serve as a condition for the independence between the two variables of the selected variable pair. Specifically, the control section 52 references the variable pairs stored in the variable pair storage section 81 to select as a conditional variable one of variables paired with any (for example, the variable S) of the two variables of the selected variable pair. Here, it is assumed that a variable W has been selected.

In step S24, the path search section 71 searches for a path between the two variables of the selected variable pair, and determines whether or not the conditional variable is provided on the path.

If it is determined in step S24 that the variable W is provided on the path between the variable S and the variable T, for example, the process proceeds to step S25, where the execution determination section 72 determines whether or not any graph structure matching the V-shaped structures stored in the V-shaped structure storage section 82 is provided on the path between the variable S and the variable T.

If it is determined in step S25 that there is any matching V-shaped structure, the variable W could not serve as a condition variable for the independence between the variables S and T on the path. Thus, in step S26, the path search section 71 searches for another path.

In step S27, it is determined whether or not there is any other path. If another path is found, the process returns to step S24, and the processes in steps S24 and S25 are performed again. If it is determined in step S24 that the variable W is not provided on the path between the variable S and the variable T, the process returns to step S23, where another conditional variable is selected.

If it is determined in step S25 that there is no matching V-shaped structure, on the other hand, the variable W may be a condition variable for the independence between the variables S and T on the path, and the process proceeds to step S28.

The processes in step S28 to step S31 and step S33 are the same as the processes in step S13 to step S17 discussed above, respectively, and thus will not be described. Here, a test for the conditional independence between the variables S and T on condition of the variable W is executed, for example. If the conditional independence between the variables S and T on condition of the variable W is adopted, the variable pair with the variables S and T is deleted from the variable pair storage section 81.

Then, in step S32, the test execution section 73 causes the separation variable set storage section 83 to store the condition variable (variable W) as a separation variable set.

If it is determined whether or not there is any other path and no other path is found in step S27, that is, if a condition variable is provided only on a path determined to have a V-shaped structure, the processes in step S28 to step S33 are skipped. That is, in this case, a test for the conditional independence between the variables S and T on condition of the variable W is not executed, and the variables S and T are left as a variable pair (linked by a side).

Here, if the variables S and T were conditionally independent, the variables S and T would have already been determined to be independent in the unconditional independence test (the processes in step S13 to step S17). This is based on the theories called "d-separation" and "faithfulness" disclosed in P. Spirtes et al. In this case, in addition, the variable W could not be a condition variable for the independence between the variables S and T. Thus, it is clear that the variables S and T are not conditionally independent, and thus a test for the conditional independence between the variables S and T is not executed.

In step S34 which follows step S32, step S33, or step S27, the control section 52 determines whether or not the processes in step S22 to step S33 have been executed, that is, a conditional independence test has been executed, for all the variable pairs stored in the variable pair storage section 81.

If it is determined in step S34 that all the variable pairs have not been processed, the process returns to step S22 to repeat the processes in step S22 to step S33 for a newly selected variable pair.

If it is determined in step S34 that all the variable pairs have been processed, on the other hand, the process proceeds to step S35. At this time, the variable pair storage section 81 stores only variable pairs with two variables, the independence between which has been rejected (two variables that are not independent), or that have not been subjected to a conditional independence test.

In step S35, the control section 52 determines whether or not there are two independent (conditionally independent) variables found in the processes discussed above.

Figure 7:
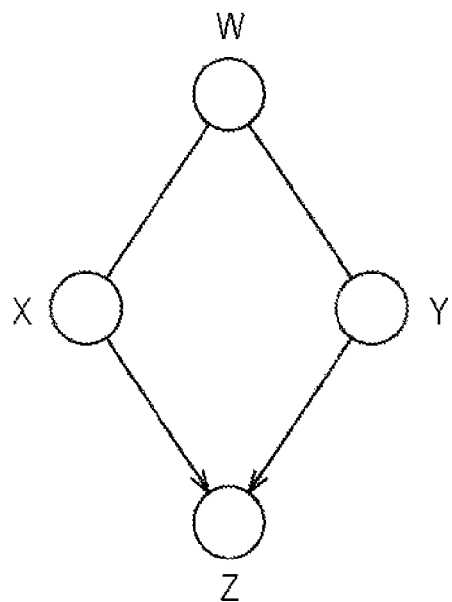
FIG. 7 illustrates a search for a V-shaped structure.

If it is determined in step S35 that there is at least one set of two independent (conditionally independent) variables, the process proceeds to step S36, where the V-shaped structure search section 74 searches for a V-shaped structure for the two independent variables. Specifically, in the case where a certain set of variables X and Y are conditionally independent on condition of a variable W and are each not independent of the variable Z and the variable Z is not stored in the separation variable set storage section 83 as a condition variable (separation variable set) for the variables X and Y as shown in FIG. 7, for example, the V-shaped structure search section 74 causes the V-shaped structure storage section 82 to store such a graph structure as a V-shaped structure.

It should be noted, however, that an error in an independence test may result in an error in the V-shaped structure obtained here, and that an increase in number of the set of conditional variables may make such an error in a test more likely to occur as discussed later. Therefore, a test may be executed even if the V-shaped structure obtained here is provided on the path between the two variables being tested.

If it is determined in step S35 that there is no set of two independent (conditionally independent) variables, on the other hand, step S36 is skipped.

In step S37, the control section 52 determines whether or not the number i of sets of conditional variables (condition variables) is the maximum number (the number of all the set included in the variable set) imax (i=imax).

If it is determined in step S37 that i=imax is not true, the process returns to step S21, where the number i of the set of conditional variables (condition variables) is incremented by 1. Then, the subsequent processes are performed.

For example, in the case where i=2 is true, processes similar to a case where i=1 is true are performed for each of the two conditional variables, and a conditional independence test is executed only in the case where both the two conditional variables meet the same conditions as in the case with one conditional variable. That is, a conditional independence test is not executed in the case where any of the conditional variables is provided on any of the paths having a V-shaped structure. Consequently, execution of an unnecessary conditional independence test may be avoided to reduce the number of occurrences of an error.

Then, if it is determined in step S37 that i=imax is true, the process is ended. When all executable tests are ended in this way, variable pairs with two variables that have been continuously determined to be not independent in the tests or that are rendered not independent without being subjected to a test remain in the variable pair storage section 81. The V-shaped structure storage section 82 stores a set of variables forming a V-shaped structure. The separation variable set storage section 83 stores a set of condition variables for two independent variables.

The content stored in the storage section 53 is output to the output section 54 under control by the control section 52. Specifically, a partially directed acyclic graph (Bayesian network) including a combination of directed edges and undirected edges is output to allow estimation of the dependence relationship or the cause-and-effect relationship between the variables.

According to the process described above, in the case where a condition variable is provided only on a path having a V-shaped structure, among paths between two variables, a test for the conditional independence between the two variables is not executed.

Figure 8:
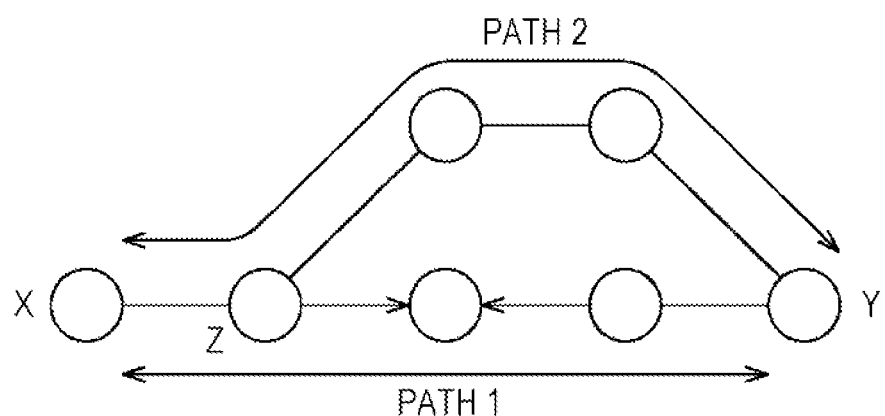
FIG. 8 illustrates a path between two variables.

For example, in the case where only a path 1 shown in FIG. 8 is found as a path between a variable X and a variable Y, the path 1 having a V-shaped structure and a condition variable Z being provided on the path 1, a test for the conditional independence between the variable X and the variable Y is not executed. It should be noted, however, that a conditional independence test is executed in the case where a path 2 having no V-shaped structure but having a conditional variable Z provided thereon is found as a path between the variable X and the variable Y.

Figure 9:
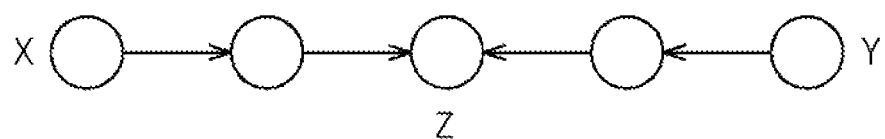
FIG. 9 illustrates a path between two variables.

In addition, in the case where only a path shown in FIG. 9 is found as a path between a variable X and a variable Y, the path having a V-shaped structure and a condition variable Z being a variable that is not independent of each of two independent variables of the V-shaped structure, a test for the conditional independence between the variable X and the variable Y is not executed.

Thus, according to the process described above, the number of executions of a conditional independence test may be reduced, which may reduce the frequency of occurrence of a test error and hence enhance the reliability of estimated cause-and-effect relationship between variables.

A process for executing a test for the independence between variables having discrete values has been described above. In the case where the variables have continuous values, however, a partial correlation coefficient serving as an index of the conditional independence and a Fisher's Z-transformation may be used to execute an independence test. Alternatively, a kernel method which is a technique used for statistical pattern recognition may be used to execute an independence test.

In the independence testing process discussed above, if the number of a set of condition variables becomes larger, the reliability of the conditional independence test is unavoidably reduced. Thus, the accuracy of the search for a V-shaped structure may also be degraded, which may result in a reduction in reliability of estimated cause-and-effect relationship between variables.

Thus, in the case where the number i of the set of conditional variables (condition variables) is incremented to exceed a predetermined number, the process in step S36 (search for a V-shaped structure) may be skipped even if it is determined in step S35 that there are two conditionally independent variables.

Consequently, a search for a V-shaped structure with poor accuracy due to a reduction in reliability of the conditional independence test is not performed, thereby avoiding a reduction in reliability of estimated cause-and-effect relationship between variables. The search for a V-shaped structure which has been skipped is executed after all the conditional independence tests are finished.

In the independence testing process discussed above, the V-shaped structure storage section 82 stores the found V-shaped structures. Because the independence testing process is executed independently for each pair of two variables, however, V-shaped structures having mutually contradictory relationship may be stored in the case where a test error is caused.

Contradiction Resolving Process

Figure 10:
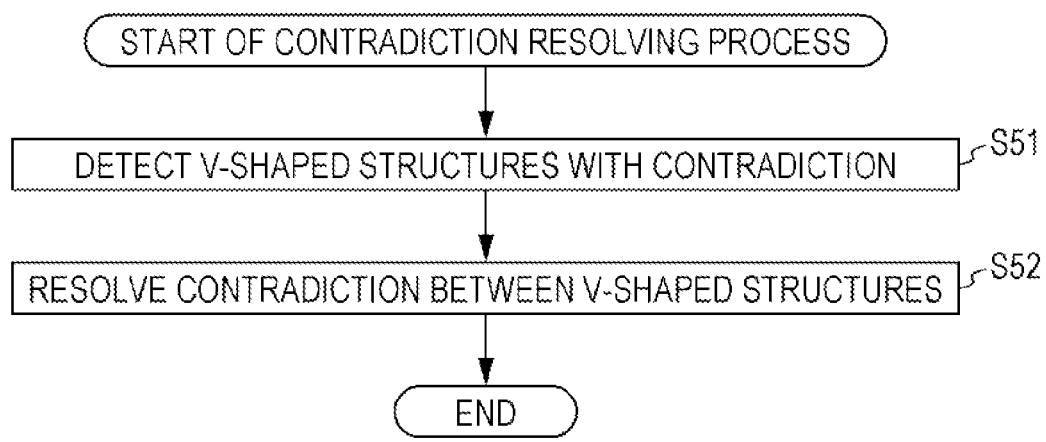
FIG. 10 is a flowchart illustrating a contradiction resolving process.

A contradiction resolving process for resolving a contradiction between V-shaped structures will be described reference to the flowchart of FIG. 10.

In step S51, the contradiction detection section 75 detects V-shaped structures with a contradiction from the V-shaped structures stored in the V-shaped structure storage section 82.

In step S52, the contradiction detection section 75 resolve the contradiction between the detected V-shaped structures in accordance with a predetermined criterion.

First Specific Example of Contradiction Resolving Process

Figure 11:
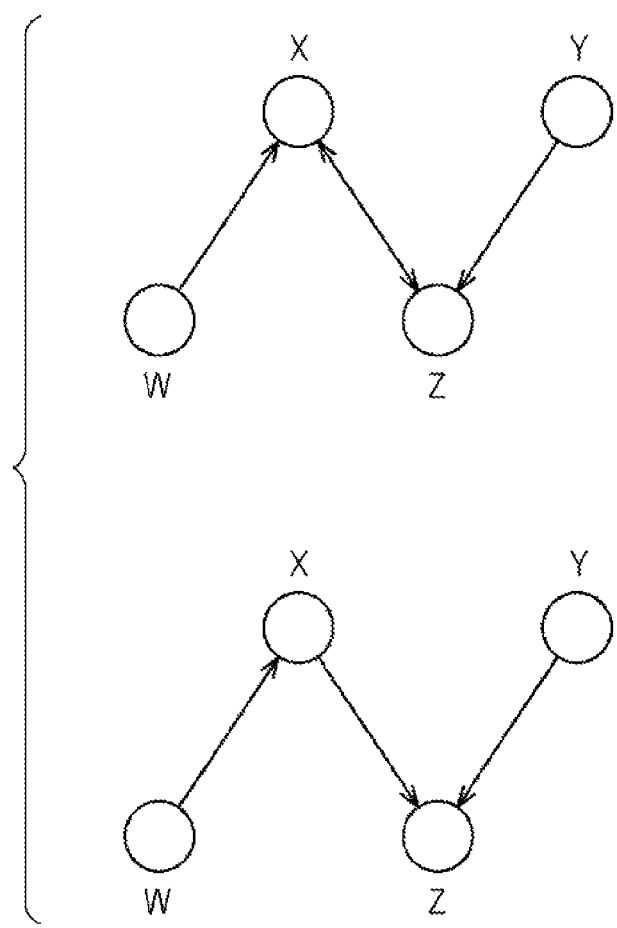
FIG. 11 illustrates a specific example of the contradiction resolving process.

FIG. 11 illustrates a specific example of the contradiction resolving process for V-shaped structures having mutually contradictory relationship.

In the upper part of FIG. 11, a V-shaped structure (X→Z←Y) in which a variable X and a variable Y which are independent are each not independent of a variable Z and a V-shaped structure (W→X←Z) in which a variable W and the variable Z which are independent are each not independent of the variable X are shown.

In this case, there is a contradiction between the relationship X→Z and the relationship X→Z.

In order to address such a contradiction, the contradiction detection section 75 uses the index of the conditional independence used in the independence test for the two independent variables of each of the V-shaped structures, specifically the p value or the conditional mutual information amount MI, to change directed edges of a V-shaped structure having two less conditionally independent variables into undirected edges.

Specifically, the respective p values for the variable X and the variable Y and for the variable W and the variable Z are compared to determine which pair of two variables are less conditionally independent. For example, in the case where the p value for the variable X and the variable Y is 0.50 and the p value for the variable W and the variable Z is 0.20, the V-shaped structure X→Z←Y having the variable X and the variable Y is adopted, and the directed edge representing the cause-and-effect relationship in which the variable Z corresponds to the cause and the variable X corresponds to the effect (hereinafter represented as "Z←X relationship", for example) is changed into an undirected edge as shown in the lower part of FIG. 11. In addition, the V-shaped structure W→X←Z is deleted from the V-shaped structure storage section 82.

Second Specific Example of Contradiction Resolving Process

Figure 12:
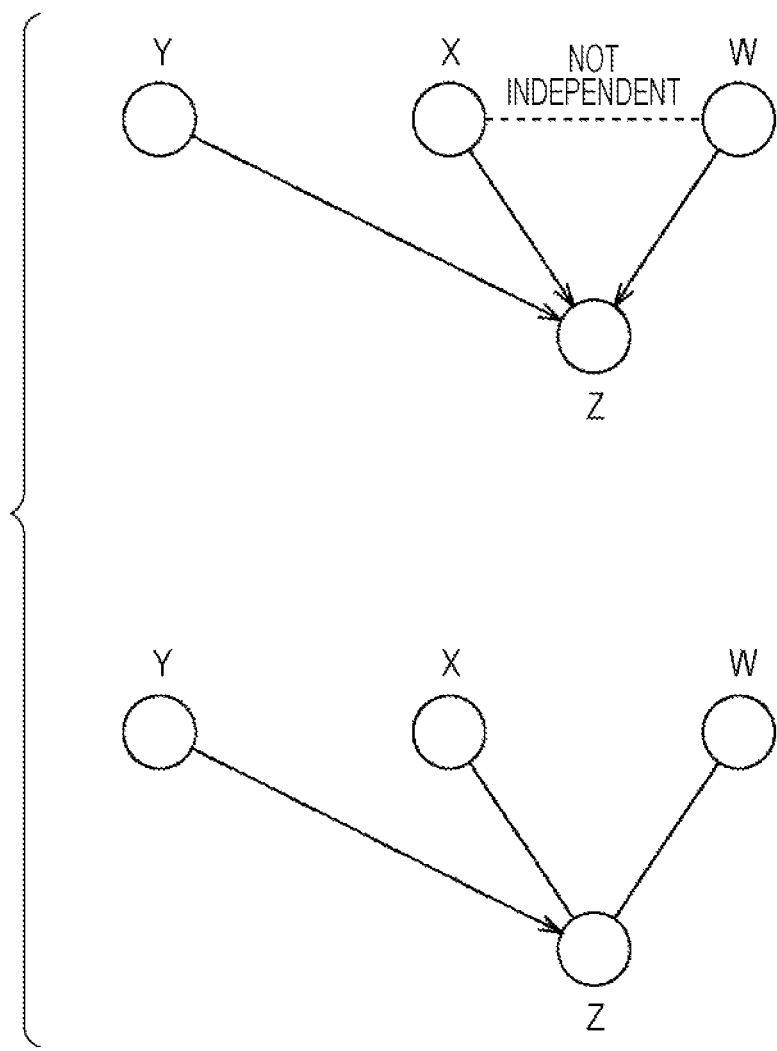
FIG. 12 illustrates a specific example of the contradiction resolving process.

FIG. 12 illustrates another specific example of the contradiction resolving process for V-shaped structures having mutually contradictory relationship.

In the upper part of FIG. 12, a V-shaped structure (X→Z←Y) in which a variable X and a variable Y which are independent are each not independent of a variable Z and a V-shaped structure (W→Z←Y) in which a variable W and the variable Y which are independent are each not independent of the variable Z are shown. In FIG. 12, the variable X and the variable W are not independent.

In this case, there is a contradiction that it is necessary that the variable X and the variable W should be intrinsically conditionally independent with a variable other than the variable Z serving as a condition variable.

In order to address such a contradiction, the contradiction detection section 75 changes the directed edges representing the X←Z relationship in the V-shaped structure X→Z←Y and the W←Z relationship in the V-shaped structure W→Z←Y into undirected edges as shown in the lower part of FIG. 12, and deletes the V-shaped structures X→Z←Y and W→Z←Y from the V-shaped structure storage section 82.

Third Specific Example of Contradiction Resolving Process

Figure 13:
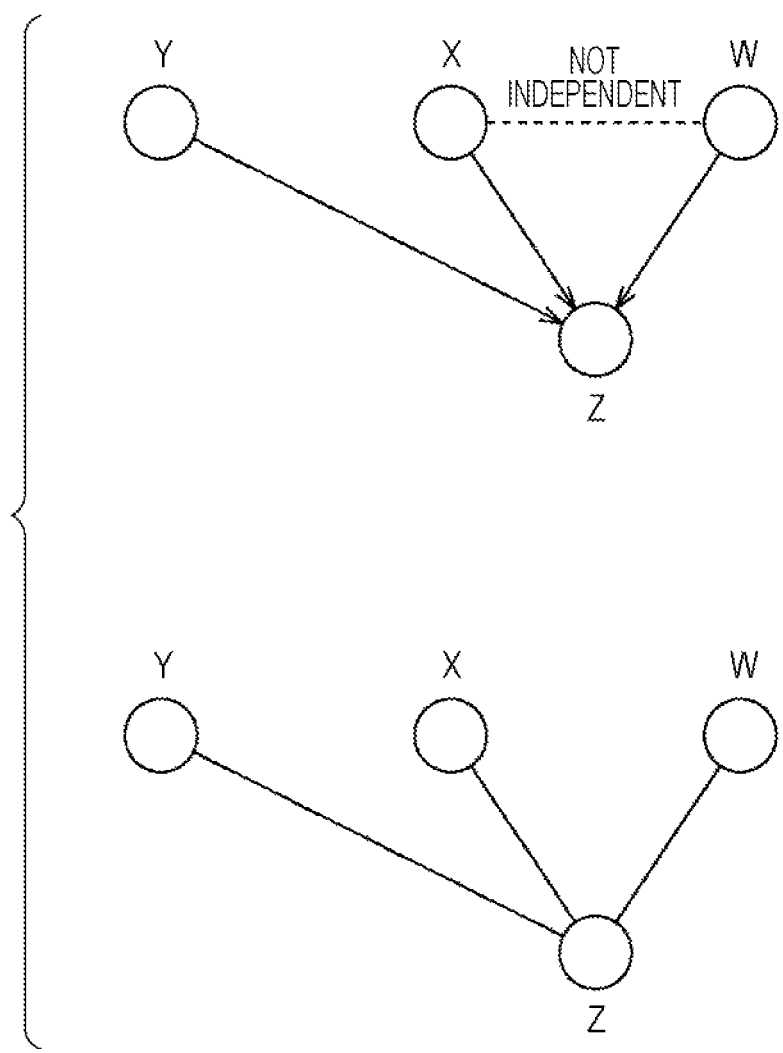
FIG. 13 illustrates a specific example of the contradiction resolving process.

FIG. 13 illustrates still another specific example of the contradiction resolving process for V-shaped structures having mutually contradictory relationship.

In the upper part of FIG. 13, as in FIG. 12, a V-shaped structure (X→Z←Y) in which a variable X and a variable Y which are independent are each not independent of a variable Z and a V-shaped structure (W→Z←Y) in which a variable W and the variable Y which are independent are each not independent of the variable Z are shown. Also in FIG. 13, the variable X and the variable W are not independent.

Also in this case, there is a contradiction that it is necessary that the variable X and the variable W should be intrinsically conditionally independent with a variable other than the variable Z serving as a condition variable.

In order to address such a contradiction, the contradiction detection section 75 changes all the directed edges in the V-shaped structure X→Z←Y and the V-shaped structure W→Z←Y into undirected edges as shown in the lower part of FIG. 13, and deletes the V-shaped structures X→Z←Y and W→Z←Y from the V-shaped structure storage section 82.

Fourth Specific Example of Contradiction Resolving Process

Figure 14:
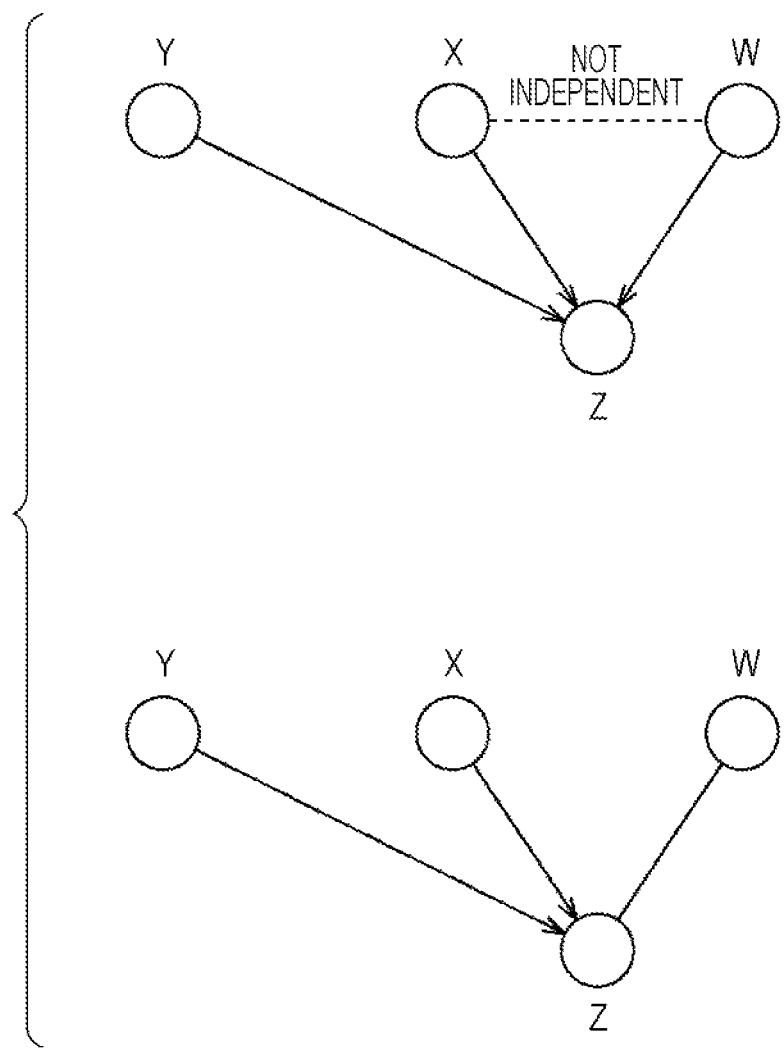
FIG. 14 illustrates a specific example of the contradiction resolving process.

FIG. 14 illustrates yet another specific example of the contradiction resolving process for V-shaped structures having mutually contradictory relationship.

In the upper part of FIG. 14, as in FIG. 12, a V-shaped structure (X→Z←Y) in which a variable X and a variable Y which are independent are each not independent of a variable Z and a V-shaped structure (W→Z←Y) in which a variable W and the variable Y which are independent are each not independent of the variable Z are shown. Also in FIG. 14, the variable X and the variable W are not independent.

Also in this case, there is a contradiction that it is necessary that the variable X and the variable W should be intrinsically conditionally independent with a variable other than the variable Z serving as a condition variable.

In order to address such a contradiction, the contradiction detection section 75 uses the index of the conditional independence used in the independence test for the two independent variables of each of the V-shaped structures, specifically the p value or the conditional mutual information amount MI, to change directed edges of a V-shaped structure having two less conditionally independent variables that are not shared by the other V-shaped structure into undirected edges.

Specifically, the respective p values for the variable X and the variable Y and for the variable W and the variable Y are compared to determine which pair of two variables are less conditionally independent. For example, in the case where the p value for the variable X and the variable Y is 0.50 and the p value for the variable W and the variable Y is 0.30, the V-shaped structure X→Z←Y having the variable X and the variable Y is adopted, and the directed edge representing the W→Z relationship in the V-shaped structure W→Z←Y that is not shared by the V-shaped structure X→Z←Y is changed into an undirected edge as shown in the lower part of FIG. 14. In addition, the V-shaped structure W→Z←Y is deleted from the V-shaped structure storage section 82.

According to the process described above, V-shaped structures with a contradiction are detected to resolve the contradiction between the V-shaped structures. Thus, executing the contradiction resolving process concurrently with the independence testing process may reduce the possibility of occurrence of an error due to a conditional independence test in which erroneous V-shaped structures are used, and hence enhance the reliability of estimated cause-and-effect relationship between variables.

Application Examples of Present Technology

The present technology may be applied to the following examples.
(1) Statistical Cause-and-Effect Relationship Estimating Device The independence testing process according to the embodiment of the present technology may be applied to a cause-and-effect relationship estimating process for estimating statistical cause-and-effect relationship from observation data on multivariate random variables. The multivariate random variables which may have discrete values or continuous values are defined by a user, and a data set has been prepared in advance. Consequently, a graphical model including a combination of directed edges and undirected edges is output as an image to a monitor or the like serving as the output section 54. In this event, the undirected edges in the graphical model may be replaced with directed edges as much as possible in accordance with orientation rules for determining the orientation of directed edges in consideration of the conditional independence. Alternatively, the graphical model may be output as text data representing equivalent relationship to a monitor or the like.
(2) Medical Diagnosis Assisting Device The independence testing process according to the embodiment of the present technology may be applied to a cause-and-effect relationship estimating process for estimating cause-and-effect relationship between a disease and a symptom. {Tuberculosis T, lung cancer L, bronchitis B, chest X-ray inspection result X, dyspnea D, and smoking status S} have been defined as random variables, and the number of internal states of each of the random variables has been prepared as data. Consequently, a variable pair having a V-shaped structure and undirected edges is revealed, and a graphical model including a combination of directed edges and undirected edges is output as an image to a monitor or the like serving as the output section 54. In addition, the undirected edges in the graphical model may be replaced with directed edges as much as possible in accordance with orientation rules for determining the orientation of directed edges in consideration of the conditional independence. In the example, {S-L}, {S-B}, {L→D}, {B→D}, {L→X}, {T→X}, etc. are output as the cause-and-effect relationship between the variables, for example.

(3) Production Management Device

The independence testing process according to the embodiment of the present technology may be applied to a cause-and-effect relationship estimating process for estimating cause-and-effect relationship between various measurement items in a factory and the yield. (Whether good product or not Y, factory temperature T, factory humidity M, measurement item 1A, measurement item 2B, and measurement item 3C) have been defined as random variables. Here, the variable Y has two discrete values indicating whether the product is good or not, and all the other variables have continuous values. Thus, all the variables are discretized using a technique according to the related art that uses the variable Y having discrete values as a reference variable to discretize all the other variables (continuous values). Consequently, a graphical model including a combination of directed edges and undirected edges is output as an image to a monitor or the like serving as the output section 54.

(4) Document Classifying Device

The independence testing process according to the embodiment of the present technology may be applied to a learning process for document classification performed in a document classifying device that classifies input documents into categories defined in advance by a user. When a document classified in advance or affixed with a classification tag is input, the document classifying device decomposes the document into parts of speech through a morphological analysis or the like. By the above process, a variable C representing the category and a variable S representing the frequency of appearance of the part of speech have been prepared. Here, the variable C has discrete values, and the variable S has continuous values. Thus, the variable S is discretized (categorized) with reference to the variable C. Then, a graphical model including a combination of directed edges and undirected edges is obtained by executing the independence testing process according to the embodiment of the present technology on the variable S having discrete values. In this event, the undirected edges may be replaced with directed edges using an information criterion. Further, the product of conditional probability distributions may be expressed as a Bayesian network by linking all the variables S and the variables C representing the category with directed edges. Consequently, a learning process for document classification is performed by estimating conditional probability distribution using the same data. By estimating (learning) the dependence relationship between the parts of speech in this way, a classifier that classifies unidentified documents with high accuracy is generated.

When a new unclassified document is input to the document classifying device, the document is decomposed into parts of speech, and information on the frequency of appearance of the parts of speech is mapped in the frequency information category of the variable S in the classifier. Thus, the input document is provided with the variable S representing the probability of appearance of each part of speech as an evidence. Then, the probability value for a category not provided with an evidence is calculated by marginalizing the variable S, and the input document is classified into a category for which the maximum probability value has been calculated.

(5) Image Identification Device

The independence testing process according to the embodiment of the present technology may be applied to a learning process for image classification performed in an image identification device that classifies input images into categories defined in advance by a user. When a plurality of images (images for learning) classified in advance or affixed with a classification tag are input, the image identification device clusters the images. Further, the image identification device uses the average value of RGB values of each of the clustered images to further cluster the images in an unsupervised manner. By the above process, a variable C representing the category and a variable V representing the average value of RGB values have been prepared. Here, the variable C has discrete values, and the variable V has continuous values. Thus, the variable V is discretized (categorized) with reference to the variable C. Then, a graphical model including a combination of directed edges and undirected edges is obtained by executing the independence testing process according to the embodiment of the present technology on the variable V having discrete values. In this event, the undirected edges may be replaced with directed edges using an information criterion. Further, the product of conditional probability distributions may be expressed as a Bayesian network by linking all the variables V and the variables C representing the category with directed edges. Consequently, a learning process for image classification is performed by estimating conditional probability distribution using the same data. By estimating (learning) the dependence relationship between RGB values in this way, a classifier that classifies unidentified images with high accuracy is generated.

When a new unclassified image is input to the image identification device, the average value of RGB values is calculated, and the average value of RGB values of the image is mapped in the RGB value category of the variable V in the classifier. Thus, the input image is provided with the variable V as an evidence. Then, the probability value for a category not provided with an evidence is calculated by marginalizing the variable V, and the input image is classified into a category for which the maximum probability value has been calculated.

Besides the examples discussed above, the present technology may also be applied to a decision support device that assists a user in making a choice, an analysis device that performs a social scientific analysis such as a genetic analysis and a psychological analysis, an analysis device that analyzes information input from a sensor, a recommendation device that makes a recommendation in accordance with the taste or the like of a user, other agent systems, and so forth.

The present technology is not limited to the embodiment described above, and may be modified in various ways without departing from the scope and spirit of the present technology.

For example, the present technology may be implemented through cloud computing in which a single function is processed jointly in a distributed manner by a plurality of devices via a network.

In addition, each step described in the flowcharts discussed above may be executed in a distributed manner by a plurality of devices, besides being executed by a single device.

Further, in the case where a plurality of processes are included in a single step, the plurality of processes included in the single step may be executed in a distributed manner by a plurality of devices, besides being executed by a single device.

The present technology may be configured as follows.

(1) An information processing apparatus that tests independence among a multiplicity of variables, including: an execution section that executes a test for conditional independence between two variables in a graphical model that are at least not independent in the case where a condition variable serving as a condition for independence between the two variables is provided on a path between the two variables; and a determination section that determines whether or not a V-shaped structure is present on a path between the two variables, the V-shaped structure being a graph structure in which first and second variables that are independent are each not independent of a third variable, in which the execution section does not execute a test for conditional independence between the two variables in the case where the condition variable is provided only on a path determined to have the V-shaped structure.

(2) The information processing apparatus according to (1), in which the execution section does not execute a test for conditional independence between the two variables in the case where the condition variable is the third variable in the V-shaped structure.

(3) The information processing apparatus according to (1) or (2), in which the execution section executes a test for unconditional independence between the first and second variables before executing a test for conditional independence, and the information processing apparatus further includes a V-shaped structure search section that searches for a graph structure in which the first and second variables are unconditionally independent and in which the first and second variables are each not independent of the third variable as the V-shaped structure.

(4) The information processing apparatus according to (3), in which the V-shaped structure search section searches for a graph structure in which the first and second variables are conditionally independent on condition of a variable other than the third variable and in which the first and second variables are each not independent of the third variable as the V-shaped structure.

(5) The information processing apparatus according to (4), in which the V-shaped structure search section does not search for the V-shaped structure in the case where the number of a set of the condition variables is incremented to exceed a predetermined number.

(6) The information processing apparatus according to any one of (1) to (5), in which the determination section determines whether or not the V-shaped structure is present for a number of paths between the two variables, the number of paths corresponding to the number of a set of the condition variables which is incremented, and the execution section does not execute a test for conditional independence between the two variables in the case where any of the condition variables is provided on any of paths determined to have the V-shaped structure.

(7) The information processing apparatus according to any one of (1) to (6), further including: a contradiction detection section that detects a contradiction between directed edges in a plurality of the V-shaped structures to change some or all of the directed edges into undirected edges to resolve the contradiction.

(8) The information processing apparatus according to (7), in which the contradiction detection section uses an index used in a test for independence between the first and second variables in the plurality of V-shaped structures to change directed edges of the V-shaped structure having the first and second variables which are less dependent into undirected edges.

(9) The information processing apparatus according to (7), in which in the case where a variable X and a variable W are not independent in a first V-shaped structure in which the variable X and a variable Y are each not independent of a variable Z and a second V-shaped structure in which the variable W and the variable Y are each not independent of the variable Z, the contradiction detection section changes a directed edge from the variable X to the variable Z in the first V-shaped structure and a directed edge from the variable W to the variable Z in the second V-shaped structure into undirected edges.

(10) The information processing apparatus according to (7), in which in the case where a variable X and a variable W are not independent in a first V-shaped structure in which the variable X and a variable Y are each not independent of a variable Z and a second V-shaped structure in which the variable W and the variable Y are each not independent of the variable Z, the contradiction detection section changes all the directed edges in the first and second V-shaped structures into undirected edges.

(11) The information processing apparatus according to (7), in which in the case where a variable X and a variable W are not independent in a first V-shaped structure in which the variable X and a variable Y are each not independent of a variable Z and a second V-shaped structure in which the variable W and the variable Y are each not independent of the variable Z, the contradiction detection section uses an index used in a test for independence between two variables to compare independence between the variable X and the variable Y and independence between the variable W and the variable Y to change directed edges of the V-shaped structure having two less independent variables into undirected edges.

(12) An information processing method for an information processing apparatus that tests independence among a multiplicity of variables, including: executing a test for conditional independence between two variables in a graphical model that are at least not independent in the case where a condition variable serving as a condition for independence between the two variables is provided on a path between the two variables; and determining whether or not a V-shaped structure is present on a path between the two variables, the V-shaped structure being a graph structure in which first and second variables that are independent are each not independent of a third variable, in which a test for conditional independence between the two variables is not executed in the case where the condition variable is provided only on a path determined to have the V-shaped structure.

(13) A program that causes a computer to execute a process for testing independence among a multiplicity of variables, the process including: executing a test for conditional independence between two variables in a graphical model that are at least not independent in the case where a condition variable serving as a condition for independence between the two variables is provided on a path between the two variables; and determining whether or not a V-shaped structure is present on a path between the two variables, the V-shaped structure being a graph structure in which first and second variables that are independent are each not independent of a third variable, in which a test for conditional independence between the two variables is not executed in the case where the condition variable is provided only on a path determined to have the V-shaped structure.

What is claimed is:

1. An information processing apparatus that tests independence among a multiplicity of variables in a data set, comprising:
one or more processors configured to:
execute a test for conditional independence between two variables in a graphical model to be displayed on a display device,
wherein the two variables are at least not independent in a case where a condition variable serving as a condition for independence between the two variables is provided on a path among a plurality of paths between the two variables,
wherein the independence between the two variables is adopted when an index value of the test for conditional independence is greater than a threshold value, wherein the index value is based on a joint probability estimated for the two variables and the condition variable; and
determine whether or not a V-shaped structure is present on one or more paths among the plurality of paths between the two variables,
wherein the V-shaped structure is a graph structure in which first and second variables are independent of each other and not independent of a third variable,
wherein the one or more paths correspond to a number of a set of condition variables which is incremented up to a predetermined number, and
wherein the test for conditional independence between the two variables is not executed in a case where the condition variable is provided on the one or more paths determined to have the V-shaped structure.

2. The information processing apparatus according to claim 1, wherein the one or more processors are configured not to execute the test for conditional independence between the two variables in a case where the condition variable is the third variable in the V-shaped structure.

3. The information processing apparatus according to claim 1, wherein the one or more processors are configured to:
execute a test for unconditional independence between the first and second variables before executing the test for conditional independence; and
search for a graph structure in which the first and second variables are unconditionally independent and in which each of the first and second variables are not independent of the third variable, as the V-shaped structure.

4. The information processing apparatus according to claim 1, wherein the one or more processors are configured to search for a graph structure in which the first and second variables are conditionally independent on condition of a variable other than the third variable and in which each of the first and second variables are not independent of the third variable, as the V-shaped structure.

5. The information processing apparatus according to claim 1, wherein the one or more processors are configured not to search for the V-shaped structure in a case where the number of the set of the condition variables is incremented to exceed the predetermined number.

6. The information processing apparatus according to claim 1, wherein the one or more processors are further configured to:
detect a contradiction between directed edges in a plurality of V-shaped structures to change one or more directed edges into undirected edges to resolve the contradiction.

7. The information processing apparatus according to claim 6, wherein the one or more processors are configured to use an index in a test for independence between the first and second variables in the plurality of V-shaped structures to change the directed edges of the V-shaped structure having the first and second variables which are less dependent, into the undirected edges.

8. The information processing apparatus according to claim 6, wherein, in a case where a variable X and a variable W are not independent in a first V-shaped structure in which the variable X and a variable Y are not independent of a variable Z, and a second V-shaped structure in which the variable W and the variable Y are not independent of the variable Z, the one or more processors are configured to change a directed edge from the variable X to the variable Z in the first V-shaped structure and a directed edge from the variable W to the variable Z in the second V-shaped structure into the undirected edges.

9. The information processing apparatus according to claim 6, wherein, in a case where a variable X and a variable W are not independent in a first V-shaped structure in which the variable X and a variable Y are each not independent of a variable Z, and a second V-shaped structure in which the variable W and the variable Y are not independent of the variable Z, the one or more processors are configured to change all the directed edges in the first V-shaped and second V-shaped structures into the undirected edges.

10. The information processing apparatus according to claim 6, wherein, in a case where a variable X and a variable W are not independent in a first V-shaped structure in which the variable X and a variable Y are not independent of a variable Z, and a second V-shaped structure in which the variable W and the variable Y are not independent of the variable Z, the one or more processors are configured to use an index used in a test for independence between two variables to compare independence between the variable X and the variable Y and independence between the variable W and the variable Y to change directed edges of a V-shaped structure from the plurality of V-shaped structures having two less independent variables into the undirected edges.

11. An information processing method for an information processing apparatus having one or more processors that test independence among a multiplicity of variables in a data set, comprising:
executing a test for conditional independence between two variables in a graphical model to be displayed on a display device,
wherein the two variables are at least not independent in a case where a condition variable serving as a condition for independence between the two variables is provided on a path among a plurality of paths between the two variables,
wherein the independence between the two variables is adopted when an index value of the test for conditional independence is greater than a threshold value, wherein the index value is based on a joint probability estimated for the two variables and the condition variable; and
determining whether or not a V-shaped structure is present on one or more paths among the plurality of paths between the two variables,
wherein the V-shaped structure is a graph structure in which first and second variables are independent of each other and not independent of a third variable,
wherein the one or more paths correspond to a number of a set of condition variables which is incremented up to a predetermined number, and
wherein the test for conditional independence between the two variables is not executed in a case where the condition variable is provided on the one or more paths determined to have the V-shaped structure.

12. A non-transitory computer-readable storage medium having stored thereon, a set of computer-executable instructions executed by one or more processors of an information processing apparatus for causing the one or more processors to execute a process for testing independence among a multiplicity of variables in a data set, the process comprising:
- executing a test for conditional independence between two variables in a graphical model to be displayed on a display device, wherein the two variables are at least not independent in a case where a condition variable serving as a condition for independence between the two variables is provided on a path among a plurality of paths between the two variables,
- wherein the independence between the two variables is adopted when an index value of the test for conditional independence is greater than a threshold value, wherein the index value is based on a joint probability estimated for the two variables and the condition variable; and
- determining whether or not a V-shaped structure is present on one or more paths among the plurality of paths between the two variables,
- wherein the V-shaped structure is a graph structure in which first and second variables are independent of each other and not independent of a third variable,
- wherein the one or more paths correspond to a number of a set of condition variables which is incremented up to a predetermined number, and
- wherein the test for conditional independence between the two variables is not executed in a case where the condition variable is provided on the one or more paths determined to have the V-shaped structure.

* * * * *